United States Patent [19]
Adachi

[11] Patent Number: 5,850,393
[45] Date of Patent: Dec. 15, 1998

[54] TRANSMITTER RECEIVER FOR MOBILE COMMUNICATION SYSTEM

[75] Inventor: Fumiyuki Adachi, Yokohama, Japan

[73] Assignee: NTT Mobile Communications Network, Inc., Japan

[21] Appl. No.: 743,192

[22] Filed: Nov. 5, 1996

[30] Foreign Application Priority Data

Nov. 9, 1995 [JP] Japan .................................... 7-291475

[51] Int. Cl.[6] .................................................. H04J 13/00
[52] U.S. Cl. .......................... 370/335; 370/342; 375/200
[58] Field of Search .................................... 370/335, 342, 370/441, 479; 375/200, 206

[56] References Cited

U.S. PATENT DOCUMENTS

| 5,689,502 | 11/1997 | Scott ........................................ 370/281 |
| 5,689,511 | 11/1997 | Shimazaki et al. ...................... 370/545 |
| 5,715,236 | 2/1998 | Gilhousen et al. ...................... 370/209 |

FOREIGN PATENT DOCUMENTS 409261761A  10/1997  Japan .

OTHER PUBLICATIONS

Technical Report of IEICE B–II, vol. J72–B–II pp. 7–15 S. Sampei, "Fading Compensation for 16QAM in Land Mobile Communications", Jan., 1989.

IEEE Transactions on Vehicular Technology vol. 42, No. 2 Seiichi Sampei and Terumi Sunaga "Rayleigh Fading Compensation for QAM in Land Mobile Radio Communications", May, 1993.

Primary Examiner—Melvin Marcelo
Attorney, Agent, or Firm—Rogers & Wells LLP

[57] ABSTRACT

A transmitter receiver implementing both frequency division duplex and time division duplex in one device in a CDMA mobile communication system. In the FDD mode, data in an interleave memory in an interleaver is read at a predetermined read rate $V_R=V_N$, where $V_N$ is a normal rate. In the TDD mode, a transmitting carrier frequency is set identical to a receiving carrier frequency, and the read rate $V_R$ of the interleave memory and the write rate $V_W$ of the deinterleave memory are set at $V_R=V_W>2V_N$. The transfer rate $V_T$ from column to column of the memories are set identical in the FDD mode and the TDD mode. This makes it possible to create a vacant duration while transferring from column to column, and to perform reception or transmission during the vacant duration. The remaining operation of the TDD mode is the same as the operation of the FDD mode.

12 Claims, 10 Drawing Sheets

TRANSMITTER RECEIVER FOR MOBILE COMMUNICATION SYSTEM

BACKGROUND OF THE INVENTION

1. Field of the Invention

The present invention relates to a CDMA (Code Division Multiple Access) mobile communication system, and particularly to a transmitter receiver for a mobile communication system which achieves both frequency division duplex (FDD) and time division duplex (TDD) in one device.

2. Description of Related Art

In most public mobile communications, bidirectional communications is achieved by FDD. In this case, different carrier frequencies are used to distinguish reverse link channels (from mobile stations to a base station) from forward link channels (from the base station to the mobile stations). For example, in PDC (Personal Digital Cellular) utilizing an 800 MHz band, the carrier frequencies are spaced 130 MHz apart (see, "Personal digital cellular telecommunication system RCR standard, RCR STD-27, Research & Development Center for Radio System).

On the other hand, TDD can be employed as another bidirectional communication method. It assigns the same carrier frequency for the forward and reverse link channels, and these channels are distinguished in the time domain. In other words, the same frequency is used alternately by the forward and reverse link channels. It is employed, for example, by PHS (Personal Handyphone System) (see, "Second generation codeless telecommunication system RCR standard, RCR STD-28", Research & Development Center for Radio System).

SUMMARY OF THE INVENTION

It is therefore an object of the present invention to provide a transmitter receiver for a mobile communication system which achieves in one device both the frequency division duplex (FDD) and time division duplex (TDD) in a CDMA communication system.

According to an aspect of the present invention, there is provided a transmitter receiver for a CDMA (Code Division Multiple Access) mobile communication system including a transmitter and a receiver, the transmitter comprising:

an interleaver for interleaving each frame of transmitted data;

an interleave memory provided in the interleaver, the interleave memory being capable of writing and reading row by row and column by column, respecively;

modulation means for data modulating the interleaved transmitted data into a narrowband modulated signal; and spread modulation means for spread modulating the narrowband modulated signal into a wideband modulated signal using a spreading sequence, wherein the interleaver writes the transmitted data into the interleave memory row by row, and reads the transmitted data from the interleave memory column by column, thereby carrying out the interleave, the receiver comprising:

despreading means for converting the wideband modulated signal into the narrowband modulated signal;

demodulation means for demodulating the narrowband signal into demodulated data;

a deinterleaver for deinterleaving the demodulated data frame by frame to recover the transmitted data; and a deinterleave memory provided in the deinterleaver, the deinterleave memory being capable of writing and reading column by column and row by row, respectively, wherein the interleaver writes the demodulated data into the deinterleave memory column by column, and reads the demodulated data from the deinterleave memory row by row, thereby carrying out the deinterleave, and the transmitter receiver comprising:

control means for controlling a transfer rate from column to column (columns/sec) at a predetermined fixed rate $V_T$ in reading data from the interleave memory and writing data into the deinterleave memory, and for variably controlling a read rate $V_R$ and a write rate $V_W$ (bits/sec) of data in each the column.

Here, the control means may set the read rate $V_R$ of each column of the interleave memory and the write rate $V_W$ of each column of the deinterleave memory at $V_R=V_W=V_T\cdot Ms$ in an FDD (Frequency Division Duplex) mode, where Ms is the number of bits in each the column, and $V_R>2V_T\cdot Ms$ and $V_W>2V_T\cdot Ms$ in a TDD (Time Division Duplex) mode, and may switch in the TDD mode the transmitter receiver from a transmitting mode to a receiving mode after reading a last bit of the column and keeps the receiving mode until starting reading of a next column.

The interleaver may write one or more pilot symbols at an initial position of the interleave memory.

The transmitter receiver for a mobile communication system may further comprise transmission power control means connected to an output side of the spread modulation means for increasing transmission power of important data in the transmitted data.

The important data may comprise the pilot symbols and control data.

The above-mentioned column and row may be exchanged.

According to the present invention, the frequency division duplex (FDD) and the time division duplex (TDD) can be achieved in one device with a simple arrangement by simply controlling the read and write rates of the interleaver and deinterleaver in the CDMA mobile communications.

In addition, writing pilot symbols at the initial position of an interleave memory obviates additional insertion of the pilot symbols thereafter.

The above and other objects, effects, features and advantages of the present invention will become more apparent from the following description of the embodiment thereof taken in conjunction with the accompanying drawings.

BRIEF DESCRIPTION OF THE DRAWINGS

FIGS. 1A–1C are schematic diagrams illustrating a transmission method used in an embodiment of a transmitter receiver for a mobile communication system in accordance with the present invention, wherein

FIG. 5 is a schematic diagram illustrating FDD and TDD, in which FIG. 5(A) illustrates the FDD mode, and FIG. 5(B) illustrates the TDD mode;

DETAILED DESCRIPTION OF PREFERRED EMBODIMENT

The invention will now be described with reference to the accompanying drawings.

First, the transmission method will be described of a CDMA mobile communication system employed in the present invention.

Figure 1A:
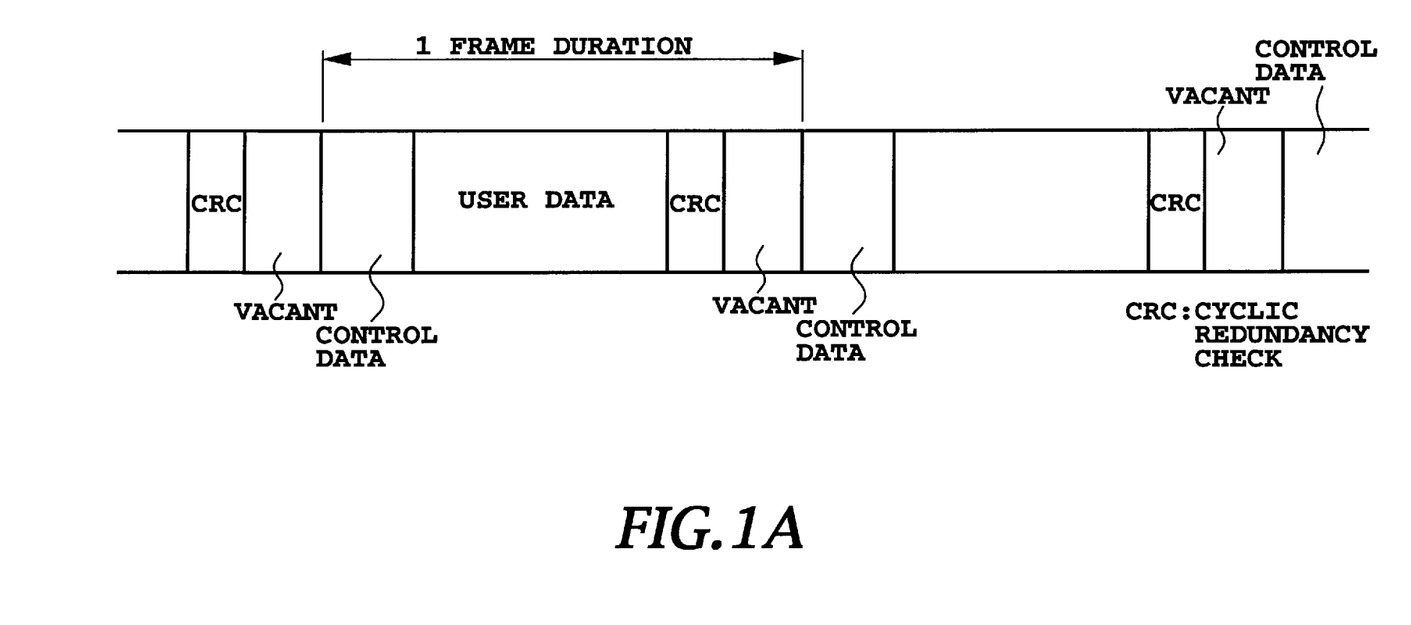
FIG. 1A illustrates the arrangement of a transmitted data frame.

FIG. 1A illustrates a frame structure in a common mobile communications. A user data sequence to be transmitted is divided into frames of a predetermined fixed duration. Subsequently, control data is added to the initial position of each frame, and a check code (CRC code, for example) of the user data in each frame is added to the final position of each frame, thereby forming one frame data. In FIG. 1A, vacant portions in the frame takes place when the total transmission rate of the control data, user data and check code is smaller than a maximum possible rate.

Figure 1B:
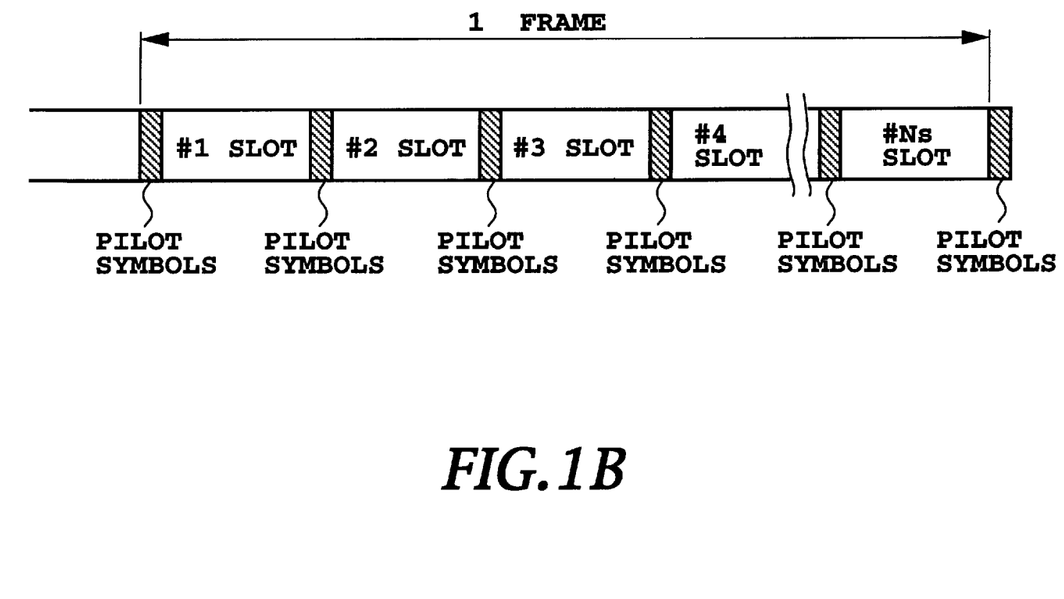
FIG. 1B illustrates pilot symbols of a known pattern.
Figure 3:
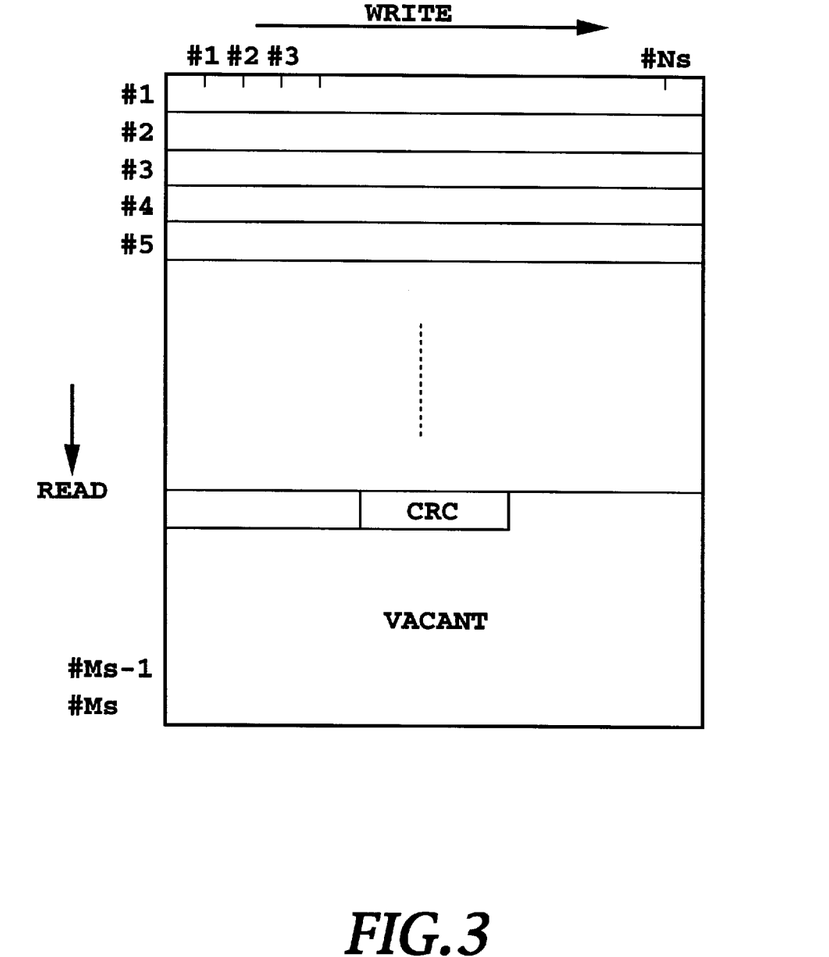
FIG. 3 is a schematic diagram illustrating a state of data stored in the memory 3A.

One frame data is interleaved as illustrated in FIG. 3, and then mapped onto a radio channel frame as shown in FIG. 1B. Pilot symbols of a known pattern are periodically inserted into the frame. The pilot symbols are used at the receiving side for coherent detection. This method is disclosed, for example, in S. Sampei, "Fading Compensation for 16QAM in Land Mobile Communications", The Transactions of the Institute of Electronics, Information and Communication Engineers of Japan B-II, Vol. J72-B-II pp. 7–15, January 1989, or its revised English version, S. Sampei, et al. "Rayleigh Fading Compensation for QAM in Land Mobile Radio Communications", IEEE Transactions on Vehicular Technology, VOL. 42. No. 2, MAY 1993.

In FIG. 1B, a section sandwiched between the pilot symbols is called a slot. If one frame consists of Ns slots, and one slot consists of Ms bits, then one frame consists of Ns·Ms bits.

The symbol sequence thus arranged undergoes primary modulation, followed by secondary modulation which spreads it using a spreading code sequence with a chip rate of an integer multiple of (tens to hundreds times) the modulated symbol rate, and is transmitted.

When the data is transmitted with the pilot symbols of a known pattern inserted periodically, the receiver estimates the state of a transmission link at each data position in the slots by using the pilot symbols, and employs the estimate as the reference signals of the coherent detection (see the foregoing Sampei paper).

Figure 2:
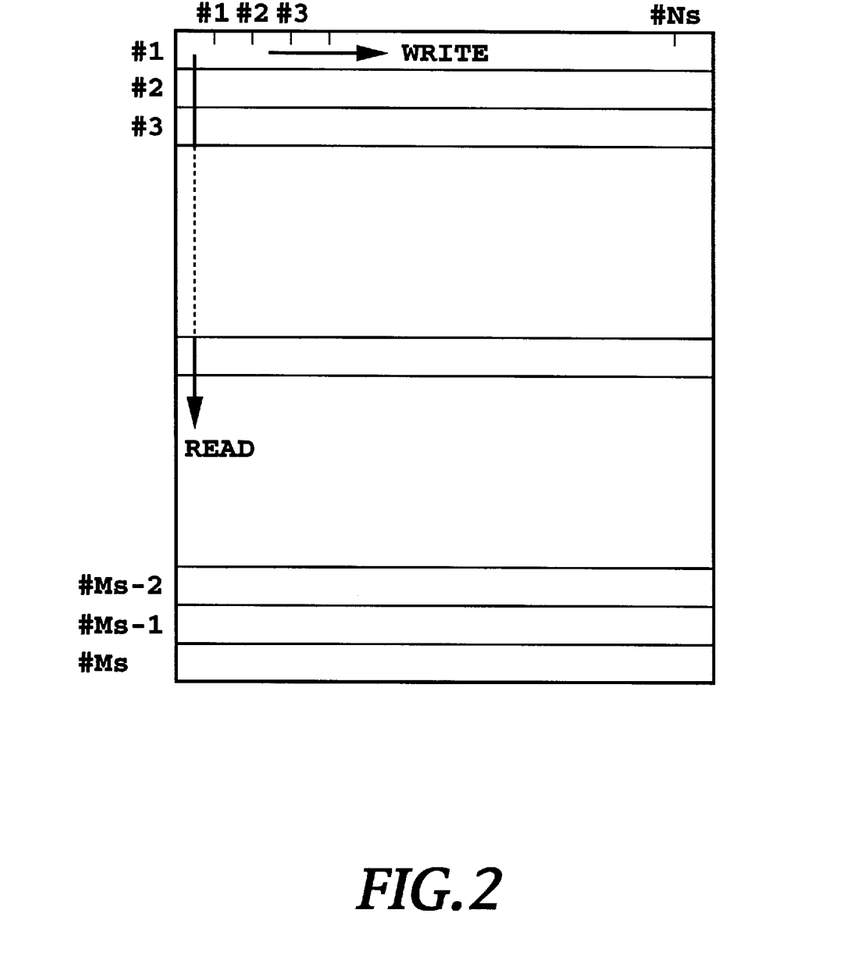
FIG. 2 is a schematic diagram illustrating the arrangement of an interleave memory 3A of the embodiment.

On the other hand, the transmitter is provided with an interleaver for assembling the transmitted data. FIG. 2 is a schematic diagram illustrating an interleave memory 3A for one frame used by the interleaver. The number of bits per row (that is, the number of columns) of the memory equals the number of slots, Ns, constituting one frame, and the number of bits per column (that is, the number of rows) equals the maximum bit number Ms constituting one slot. The transmitted data of one frame is written bit by bit in the row of the interleave memory, whereas it is read in the column.

Figure 1C:
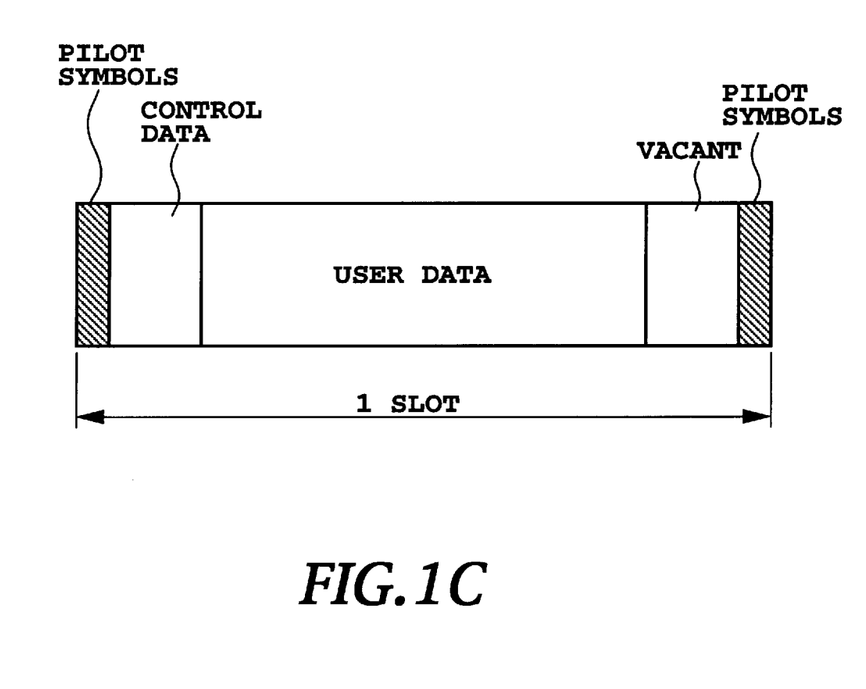
FIG. 1C illustrates the arrangement of a radio channel slot.

FIG. 3 illustrates a state in which the data is written in the interleave memory 3A. As shown in FIG. 3, one frame data including the check code (CRC) for error detection is written in the interleave memory 3A. The data thus written into the interleave memory 3A is read in the vertical direction (column by column), so that the data is sequentially mapped onto the slots. Thus, the column number (1–Ns) corresponds to the slot number in FIG. 1B. By reading the data from the interleave memory in this way, the individual slots are arranged as shown in FIG. 1C. The vacant portions in FIG. 1C correspond to the vacant area in each frame.

The above is the configuration for preparing data at the transmitter. The receiver, on the other hand, has a deinterleaver for reassembling the interleaved transmitted data into its original order. The deinterleaver also comprises a deinterleave memory with an arrangement similar to that of FIG. 2, except that the write and read directions are inverted to those of the interleaver. That is, the receiver obtains the original data by writing column by column direction and by reading row by row.

Figure 4:
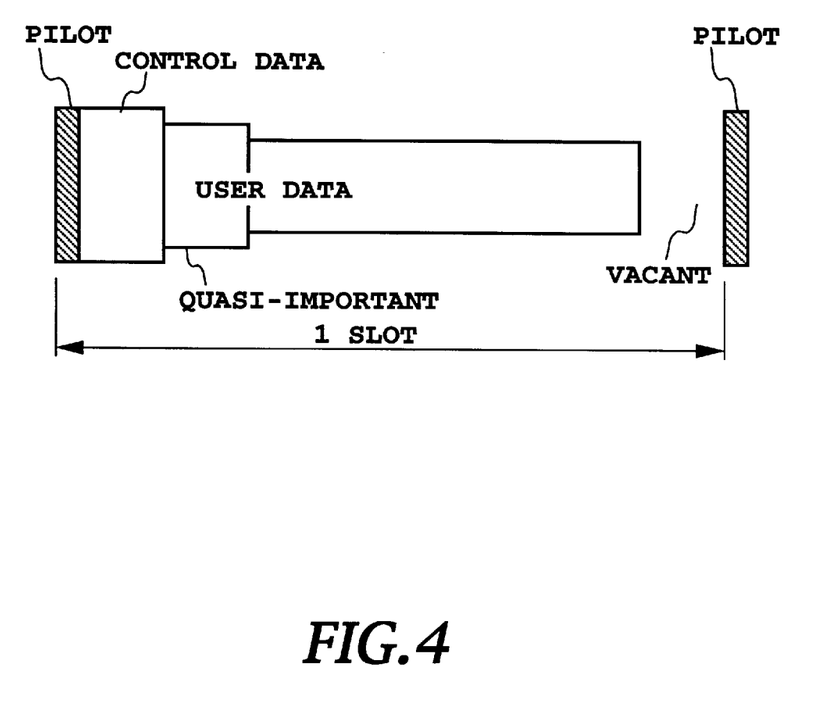
FIG. 4 is a schematic diagram illustrating an example of transmission power control in the embodiment.

The transmission thus carried out enables the power of the mobile station to be reduced. FIG. 4 illustrates this. The pilot symbols and control data next to them are transmitted with greater power. The vacant portion is not sent. The transmission method is disclosed in Japanese patent application No. 7-35702 (PCT/JP96/00419) "Transmission method, transmitter and receiver used for implementing the method", which was filed by the present assignee.

An embodiment of a transmitter receiver for a mobile system in accordance with the present invention will now be described, which implements the frequency division duplex (FDD) and time division duplex (TDD) in one device in such a transmission system.

Figure 5:
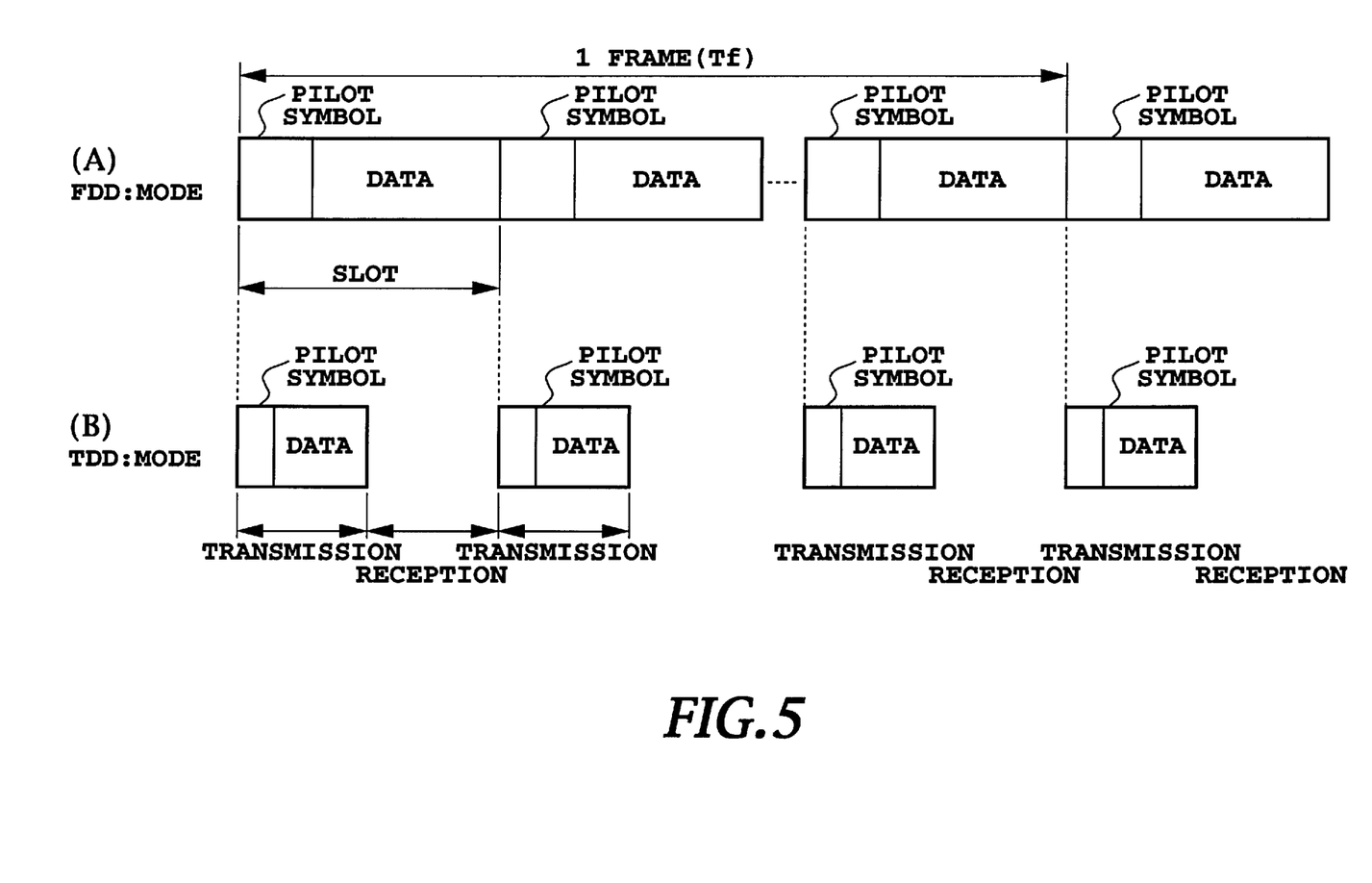

First, the frequency division duplex (FDD) and time division duplex (TDD) will be described with reference to FIG. 5. FIG. 5 is a schematic diagram illustrating transmission behavior of the FDD and TDD for one frequency, wherein FIG. 5(A) illustrates transmitted data in the FDD mode, and FIG. 5(B) illustrates transmitted data in the TDD mode.

First, FIG. 5(A) illustrates a state in which the transmitter of the transmitter receiver transmits using the assigned carrier frequency. The receiver of the transmitter receiver receives data using another carrier frequency.

On the other hand, FIG. 5(B) illustrates a state in which the transmission and reception are switched in accordance with time using the same carrier frequency. In this case, it is preferable that the transmission and reception be altered at each slot because the pilot symbols are inserted in each slot.

Figure 6:
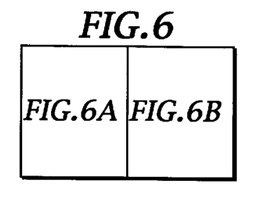
FIG. 6 is a block diagram showing the embodiment of a transmitter receiver for a mobile communication system in accordance with the present invention.
Figure 6A:
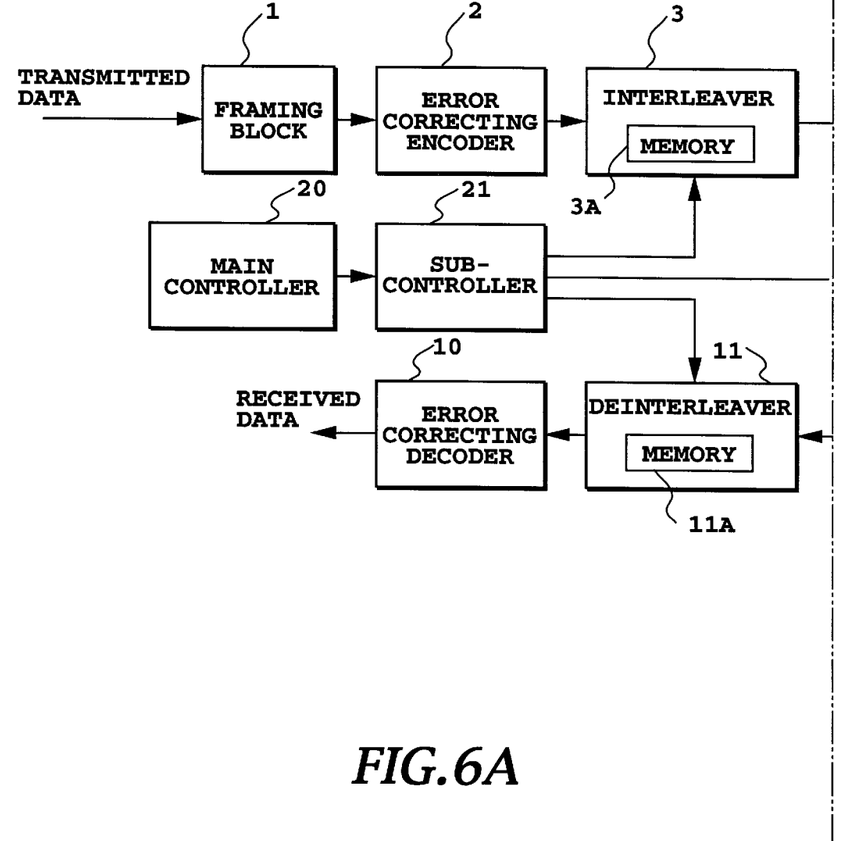
Figure 6B:
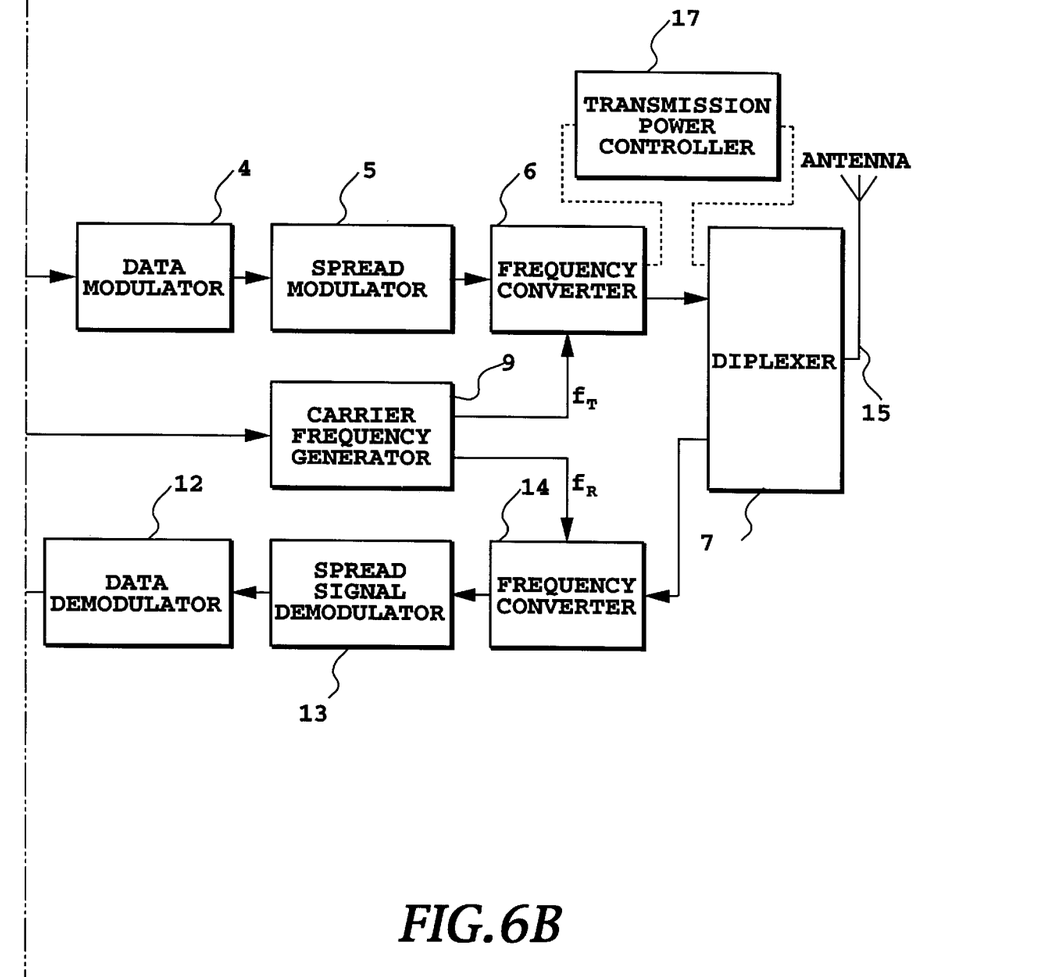

FIG. 6 shows the configuration of the transmitter receiver which implements the FDD and TDD in one radio device. In FIG. 6, a framing block 1 divides the transmitted data sequence into frames. An error correcting encoder 2 generates error correcting check bits in terms of each frame data. An interleaver 3 includes interleave memory 3A as shown in FIG. 2 for assembling the frame data into data consisting of individual slots. In reading data from the interleave memory 3A, although the transfer rate $V_T$ (columns/sec) from column to column is constant, the read rate $V_R$ (bits/sec) at which the data in each column (Ms bits/sec) is read out is switched in response to the FDD or TDD mode. This will be described in further detail later.

A data modulator 4 carries out primary modulation of the data read out from the interleave memory 3A. A spread modulator 5 carries out secondary modulation of the output of the data modulator 4 to produce a wideband signal from the narrowband signal, thereby outputting a spread signal. A frequency converter 6 converts the spread signal into the transmitted signal at a assigned carrier frequency. The carrier frequency is fed to the frequency converter 6 from a carrier frequency generator 9. The transmitted signal thus formed is radiated into air from an antenna 15 through a diplexer 7.

If the transmission power control is necessary as shown in FIG. 4, a transmission power controller 17 is placed between the frequency converter 6 and the diplexer 7 to control the transmission power. In this case, the lengths of the pilot symbols, control data and quasi-important user data are each determined in advance so that the transmission power is controlled in accordance with the data lengths.

Next, the configuration of the receiver will be described. A received signal received through the antenna 15 and the diplexer 7 is fed to a frequency converter 14. The received signal undergoes frequency conversion by the frequency converter 14 using a signal from the carrier frequency generator 9. The frequency converted signal is converted into a narrowband modulation signal from a wideband spread signal by a spread signal demodulator 13, and then restored into the original data by a data demodulator 12.

A deinterleaver 11 recovers the original data frames using a deinterleave memory 11A. The write rate $V_W$ (bits/sec) of data in each column of the deinterleave memory 11A is switched in response to the FDD or TDD mode while keeping fixed the transfer rate $V_T$ from column to column. An error correcting decoder 10 carries out error correcting of each frame output from the deinterleaver 11, thereby outputting it as received data.

The transmitter and receiver are controlled by a main controller 20 and a sub-controller 21.

Figure 7:
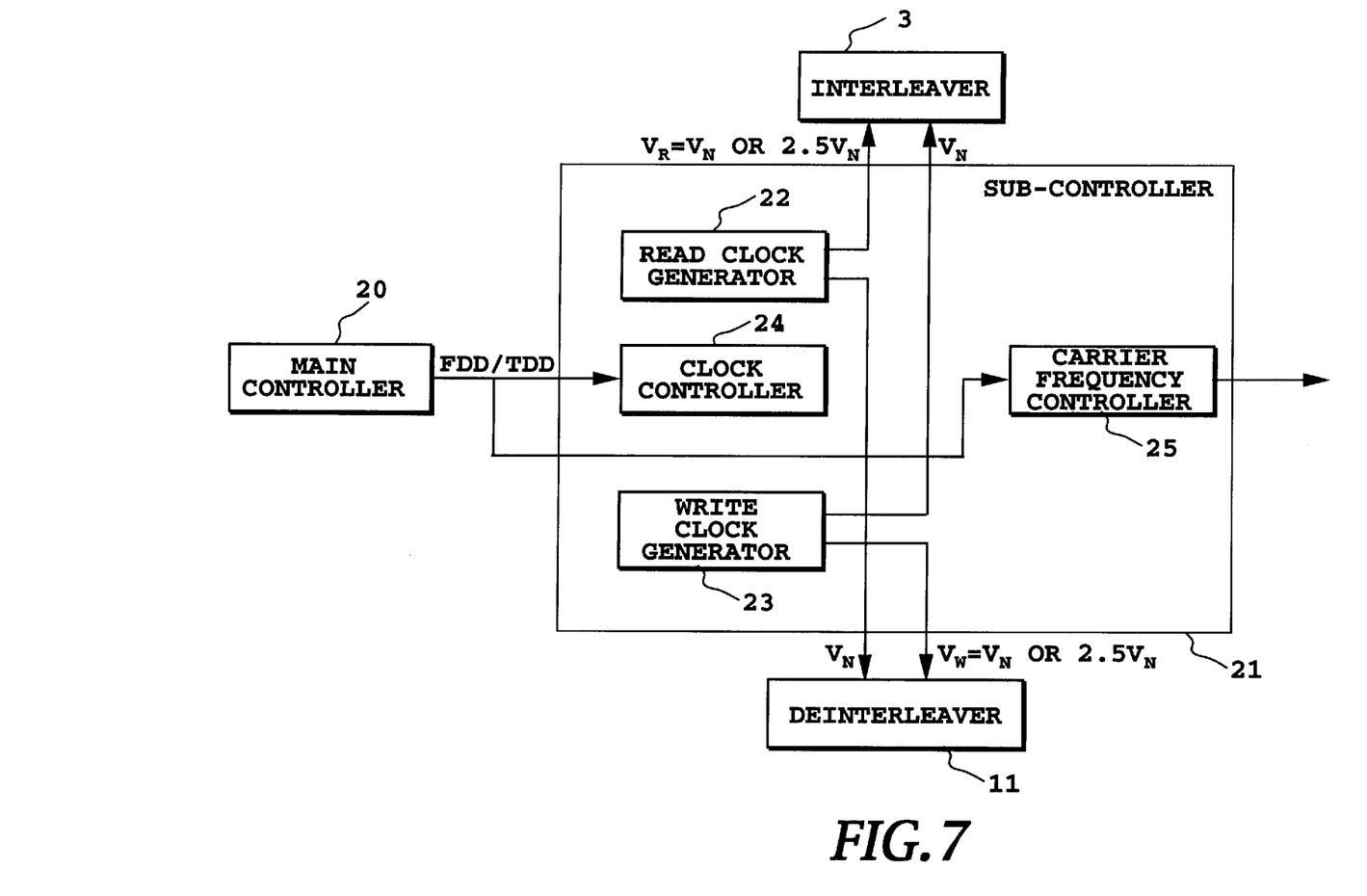
FIG. 7 is a block diagram showing the configuration of a sub-controller of the embodiment.

FIG. 7 is a block diagram showing a configuration of the sub-controller 21. In this figure, a read clock generator 22 generates a read clock signal of the memory 3A of the interleaver 3 and a read clock signal of the memory 11A of the deinterleaver 11. On the other hand, a write clock generator 23 generates write clock signals of the memories 3A and 11A. The frequencies of the clock signals are controlled by a clock controller 24 such that both the read rate $V_R$ of the memory 3A and the write rate $V_W$ of the memory 11A become greater than twice a normal rate $V_N$=Ms·$V_T$ (bits/sec) in the TDD mode, where Ms is the number of bits per column (bits/column) of the memories 3A and 11A, and VT is a transfer rate (columns/sec: fixed) from column to column. The reason for setting in the TDD mode the read rate $V_R$ of the memory 3A and the write rate $V_W$ of the memory 11A greater than twice the normal rate is to create a vacant time period in the output of the interleaver 3. For example, setting $V_R$=2.5$V_N$ can create a vacant time period of 0.6 slot duration in each slot. The vacant time period can be used to switch the transmission and reception.

More specifically, the clock controller 24 in the sub-controller 21 controls, in the FDD mode, the clock generators 22 and 23 such that they generate the clock signals of a frequency which causes the read rate $V_R$ of the memory 3A and the write rate $V_W$ of the memory 11A to be set at the normal rate $V_N$. On the other hand, in the TDD mode, the clock controller 24 controls the clock generators 22 and 23 such that they generate the clock signals of a frequency which causes the read rate $V_R$ in the read duration of the memory 3A to be set at greater than twice the normal rate, at 2.5$V_N$, for example, and the write rate $V_W$ in the write duration of the memory 11A to be set at greater than twice the normal rate, at 2.5$V_N$, for example. The write rate to the memory 3A and the read rate from the memory 11A are fixed at the normal rate $V_N$ in both the FDD and TDD modes.

A carrier frequency controller 25 controls the frequency of the carrier generated by the carrier frequency generator 9 in response to the instructions of the main controller 20. Specifically, in the FDD mode, it controls the carrier frequency generator 9 such that the transmitting carrier frequency $f_T$ and the receiving carrier frequency $f_R$ take predetermined different frequencies, whereas in the TDD mode, it controls the carrier frequency generator 9 such that the transmitting carrier frequency $f_T$ coincides with the receiving carrier frequency $f_R$.

With such an arrangement, the operation of the embodiment will now be described for implementing the FDD and TDD in a single transmitter receiver.

A data sequence to be transmitted is fed to the framing block 1. The framing block 1 divides the transmitted data sequence into data of predetermined one frame duration (Tf), thereby structuring frames. The error correcting encoder 2 error correcting encodes the transmitted data in each frame to be fed to the interleaver 3. The interleaver 3 writes the transmitted data into each row (in the horizontal direction) of the interleave memory 3A consisting of Ms rows and Ns columns at the normal rate $V_N$. In this case, writing the pilot symbols in the first row will obviate the need for adding the pilot symbols later. The interleaver 3, after having written the transmitted data of one frame, reads out the written transmitted data from each column (in the vertical direction) from the memory 3A. The operation thereafter will be described separately under the headings of the FDD mode and TDD mode.

(1) The operation of the FDD mode

In the FDD mode, the interleaver 3 in the transmitter reads the transmitted data from column to column in the interleave memory 3A at the normal rate $V_N$ (=Ms·$V_T$) bits/sec in accordance with the clock signal fed from the read clock generator 22. Thus, the read rate of the memory 3A is $V_R$=$V_N$ in the FDD mode. Since each column of the memory 3A constitutes one slot, one slot consists of Ms bits (including the pilot symbols).

The transmitted data sequence produced by the interleaver 3 undergoes data modulation by the data modulator 4, followed by the spread modulation by the spread modulator 5. The spread signal is converted into a signal with a predetermined transmission carrier frequency of $f_T$ by the frequency converter 6 to be transmitted. The transmitter receiver has the diplexer 7 which separates the signals associated with the transmission and the reception, carrier frequencies On the other hand, the frequency converter 14 of the receiver frequency converts the received signal using a predetermined frequency $f_R$. The frequency converted received signal is despread by the spread signal demodulator 13, and then data demodulated by the data demodulator 12. The demodulated data is fed to the deinterleaver 11. The deinterleaver 11 writes the demodulated data into the deinterleave memory 11A column by column (in the vertical direction) at the write rate $V_W$=$V_N$ (normal rate) in accordance with the clock signal fed from the write clock generator 23. The written data is read out from the deinterleave memory 11A row by row (in the horizontal direction) at the normal rate $V_N$.

Thus, in the FDD mode, although the write rate of the deinterleave memory 11A equals the read rate of the interleave memory 3A, that is, the normal rate $V_N$, the write direction and read direction of the deinterleave memory 11A are inverse to those of the interleave memory 3A. In addition, the area in the deinterleave memory 11A corresponding to the area occupied by the pilot symbols in the interleave memory 3A is vacant. The deinterleaver 11 differs from the interleaver 3 in these two points. The data output from the deinterleaver 11 undergoes error correcting decoding by the error correcting decoder 10, so that the original data is restored.

(2) The operation of the TDD mode

In the TDD mode, the carrier frequency controller 25 of the sub-controller 21 sets the transmitting carrier frequency $f_T$ and the receiving carrier frequency $f_R$ at the same frequency ($f_T=f_R$). In addition, the read rate $V_R$ of the interleave memory 3A is set at $V_R>2V_N$, and the write rate $V_W$ of the deinterleave memory 11A is set at $V_W>2V_N$. For example, $V_R$ of the interleave memory 3A and $V_W$ of the deinterleave memory 11A are set at $V_R=V_W=2.5V_N$, thereby creating a vacant duration of 0.6 slot in each slot. The transmission and reception can be switched in the vacant duration. The remaining operation is the same as that of the FDD mode.

The spread modulation, which modulates the signal after the data modulation using a spreading sequence with a rate higher than the bit rate of the transmitted data, can set the rate (chip rate) of the spreading sequence of the TDD mode at that of the FDD mode, or at the higher rate by the factor of the read rate of the FDD mode. spreading sequence of the TDD mode at that of the FDD mode, or at the higher rate by the factor of the read rate of the FDD mode.

The present invention has been described in detail with respect to an embodiment and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transmitter receiver for a CDMA (Code Division Multiple Access) mobile communication system including a transmitter and a receiver, said transmitter comprising:
an interleaver for interleaving each frame of transmitted data;
an interleave memory provided in said interleaver, said interleave memory being capable of writing and reading row by row and column by column, respectively;
modulation means for data modulating the interleaved transmitted data into a narrowband modulated signal; and
spread modulation means for spread modulating said narrowband modulated signal into a wideband modulated signal using a spreading sequence,
wherein said interleaver writes said transmitted data into said interleave memory row by row, and reads said transmitted data from said interleave memory column by column, thereby carrying out the interleave, said receiver comprising:
despreading means for converting said wideband modulated signal into said narrowband modulated signal;
demodulation means for demodulating said narrowband signal into demodulated data;
a deinterleaver for deinterleaving said demodulated data frame by frame to recover said transmitted data; and
a deinterleave memory provided in said deinterleaver, said deinterleave memory being capable of writing and reading column by column and row by row respectively,
wherein said interleaver writes said demodulated data into said deinterleave memory column by column, and reads said demodulated data from said deinterleave memory row by row, thereby carrying out the deinterleave, and said transmitter receiver comprising:
control means for controlling a transfer rate from column to column (columns/sec) at a predetermined fixed rate $V_T$ in reading data from said interleave memory and writing data into said deinterleave memory, and for variably controlling a read rate $V_R$ and a write rate $V_W$ (bits/sec) of data in each said column.

2. The transmitter receiver for a mobile communication system as claimed in claim 1, wherein said control means sets the read rate $V_R$ of each column of said interleave memory and the write rate $V_W$ of each column of said deinterleave memory at $V_R=V_W=V_T \cdot Ms$ in an FDD (Frequency Division Duplex) mode, where Ms is the number of bits in each said column, and $V_R>2V_T \cdot Ms$ and $V_W>2V_T \cdot Ms$ in a TDD (Time Division Duplex) mode, and switches in said TDD mode said transmitter receiver from a transmitting mode to a receiving mode after reading a last bit of said column and keeps the receiving mode until starting reading of a next column.

3. The transmitter receiver for a mobile communication system as claimed in claim 1, wherein said interleaver writes one or more pilot symbols at an initial position of said interleave memory.

4. The transmitter receiver for a mobile communication system as claimed in claim 2, wherein said interleaver writes one or more pilot symbols at an initial position of said interleave memory.

5. The transmitter receiver for a mobile communication system as claimed in claim 1, further comprising transmission power control means connected to an output side of said spread modulation means for increasing transmission power of important data in said transmitted data.

6. The transmitter receiver for a mobile communication system as claimed in claim 5, wherein said important data comprises said pilot symbols and control data.

7. A transmitter receiver for a CDMA (Code Division Multiple Access) mobile communication system including a transmitter and a receiver, said transmitter comprising:
an interleaver for interleaving each frame of transmitted data;
an interleave memory provided in said interleaver, said interleave memory being capable of writing and reading row by row and column by column, respectively;
modulation means for data modulating the interleaved transmitted data into a narrowband modulated signal; and
spread modulation means for spread modulating said narrowband modulated signal into a wideband modulated signal using a spreading sequence,
wherein said interleaver writes said transmitted data into said interleave memory column by column, and reads said transmitted data from said interleave memory row by row, thereby carrying out the interleave, said receiver comprising:
despreading means for converting said wideband modulated signal into said narrowband modulated signal;

demodulation means for demodulating said narrowband signal into demodulated data;

a deinterleaver for deinterleaving said demodulated data frame by frame to recover said transmitted data; and a deinterleave memory provided in said deinterleaver, said deinterleave memory being capable of writing and reading column by column and row by row respectively, wherein said interleaver writes said demodulated data into said deinterleave memory row by row, and reads said demodulated data from said deinterleave memory column by column, thereby carrying out the deinterleave, and said transmitter receiver comprising:

control means for controlling a transfer rate from column to column (column/sec) at a predetermined fixed rate $V_T$ in reading data from said interleave memory and writing data into said deinterleave memory, and for variably controlling a read rate $V_R$ and a write rate $V_W$ (bits/sec) of data in each said row.

8. The transmitter receiver for a mobile communication system as claimed in claim 7, wherein said control means sets the read rate $V_R$ of each row of said interleave memory and the write rate $V_W$ of each row of said deinterleave memory at $V_R = V_W = V_T \cdot Ms$ in an FDD (Frequency Division Duplex) mode, where Ms is the number of bits in each said row, and $V_R > 2V_T \cdot Ms$ and $V_W > 2V_T \cdot Ms$ in a TDD (Time Division Duplex) mode, and switches in said TDD mode said transmitter receiver from a transmitting mode to a receiving mode after reading a last bit of said row and keeps the receiving mode until starting reading of a next row.

9. The transmitter receiver for a mobile communication system as claimed in claim 7, wherein said interleaver writes one or more pilot symbols at an initial position of said interleave memory.

10. The transmitter receiver for a mobile communication system as claimed in claim 8, wherein said interleaver writes one or more pilot symbols at an initial position of said interleave memory.

11. The transmitter receiver for a mobile communication system as claimed in claim 7, further comprising transmission power control means connected to an output side of said spread modulation means for increasing transmission power of important data in said transmitted data.

12. The transmitter receiver for a mobile communication system as claimed in claim 11, wherein said important data comprises said pilot symbols and control data.

* * * * *